United States Patent [19]
Catlin et al.

[11] 3,986,630
[45] Oct. 19, 1976

[54] SYSTEMS FOR TRANSFERRING MATERIALS

[75] Inventors: Jack Robert Catlin, Wellington; Andrew Patrick Power, Seascale, both of England

[73] Assignee: British Nuclear Fuels Limited, England

[22] Filed: Oct. 11, 1974

[21] Appl. No.: 514,135

[30] Foreign Application Priority Data
Oct. 24, 1973  United Kingdom............. 49656/73

[52] U.S. Cl. ............................. 220/86 NR; 29/422
[51] Int. Cl.² ........................................... B65B 3/00
[58] Field of Search ............. 220/86 R, 86 NR, 2.2; 29/422, 516; 53/366

[56] References Cited
UNITED STATES PATENTS

| | | | |
|---|---|---|---|
| 1,914,634 | 6/1933 | Eden et al............................ | 220/2.2 |
| 2,343,457 | 3/1944 | Herzog................................. | 220/2.2 |
| 3,276,447 | 10/1966 | Hamilton ............................. | 29/422 |
| 3,474,277 | 10/1969 | Zollweg et al. ...................... | 220/2.2 |

*Primary Examiner*—Richard E. Aegerter
*Assistant Examiner*—L. Footland
*Attorney, Agent, or Firm*—Larson, Taylor and Hinds

[57] ABSTRACT

A vessel for receiving material from an area of total containment, such as a glove box, provided with an integral filling tube through which the material is transferred, the filling tube being capable of passing through a sphincter valve and of being constricted to the point of severance to obtain simultaneous sealing at both ends of the disjunction.

3 Claims, 3 Drawing Figures

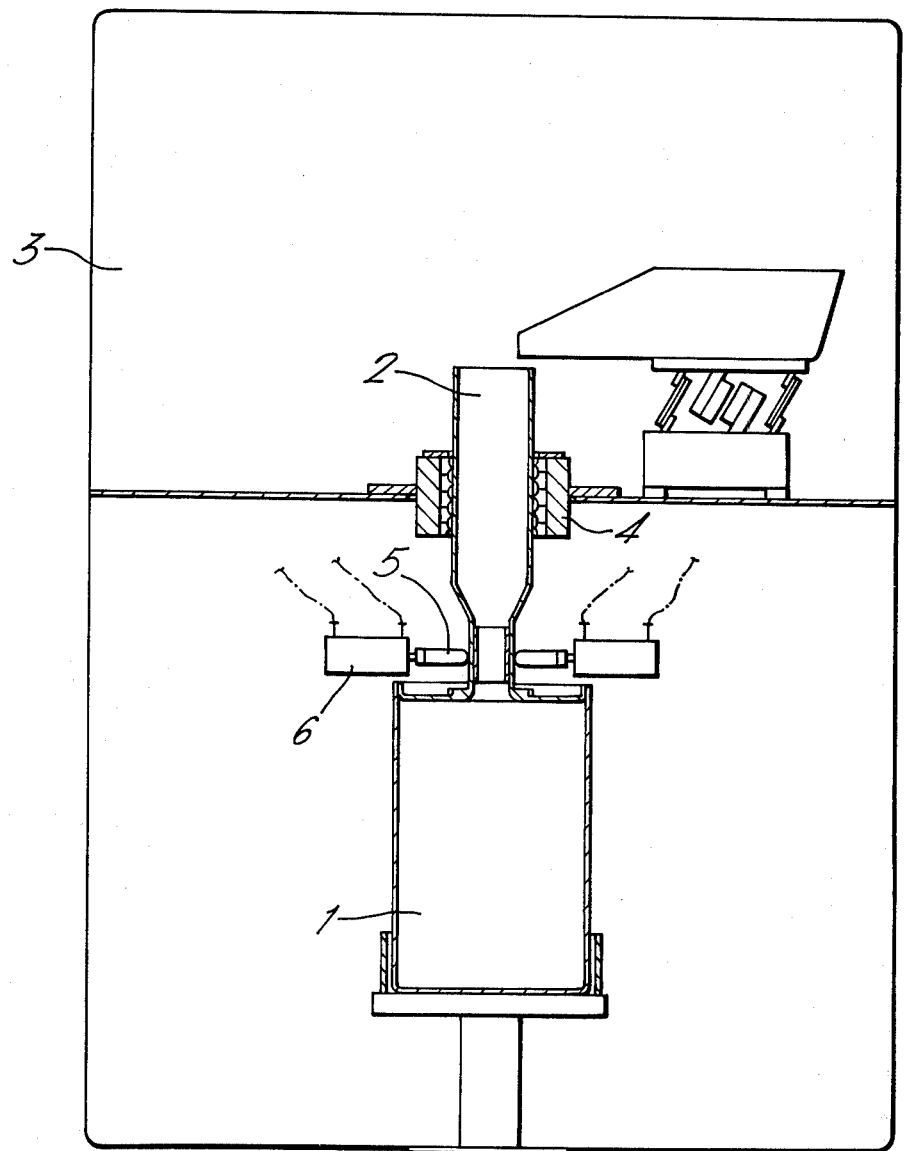
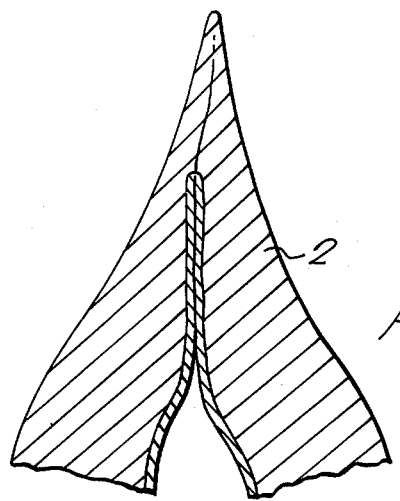
Fig. 1.
Fig. 2.

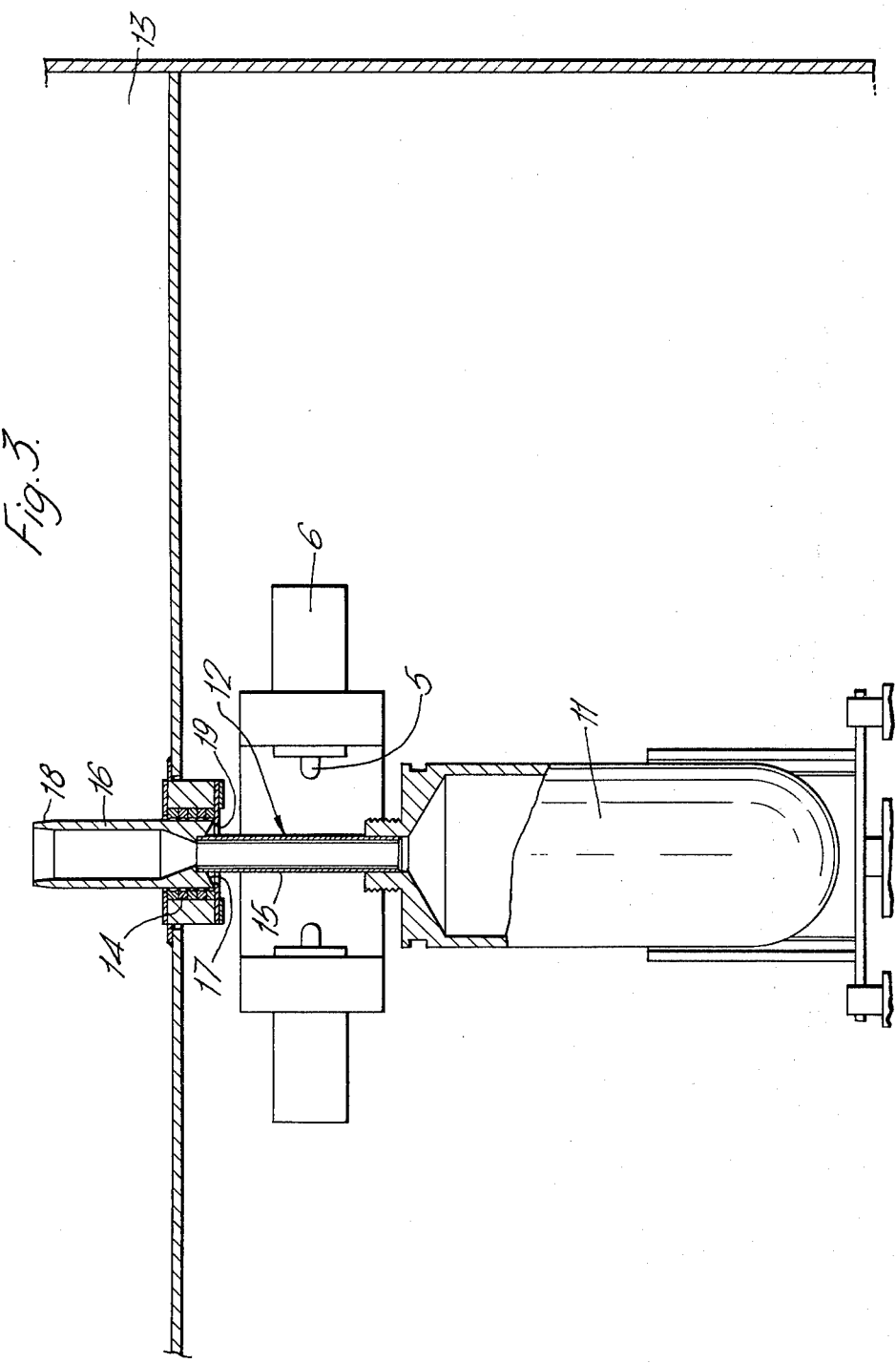

SYSTEMS FOR TRANSFERRING MATERIALS

BACKGROUND OF THE INVENTION

This invention relates to systems for transferring materials into and out of total containment, for example glove boxes. The system relies on the use of sphincter valves which are devices whereby a relatively long and usually smooth and cylindrical casing is passed from one area to another through a series of adjoining ring seals in one direction only so that there is no movement of air, dust or contamination in the opposite direction, unidirectional movement being guaranteed by displacing a casing passing through the seals by another similar casing.

SUMMARY OF THE INVENTION

According to the present invention a vessel for receiving material from an area of total containment is provided with an integral filling tube capable of passing through a sphincter valve and of being constricted to the point of severance to obtain simultaneous sealing at both ends of the disjunction.

In a preferred embodiment of the invention the filling tube is at least in part of a composite construction comprising inner and outer layers of material such that the inner material is flattened or otherwise constricted and then fractured prior to the final sealing of the tube by the outer material. This may be achieved by a thin inner tube of low ductility material intimately incorporated (for example by co-extrusion) in a thicker outer tube of high ductility material.

DESCRIPTION OF THE DRAWINGS

The invention will now be described with reference to the accompanying drawings (FIGS. 1 to 3) which are diagrammatic side views in section.

FIGS. 1 and 3 show alternative embodiments.

FIG. 2 is a fragmentary view on an enlarged scale.

DESCRIPTION OF PREFERRED EMBODIMENTS

FIG. 1 of the drawings shows an aluminum alloy vessel 1 for receiving material from an area of total containment which is a glove box 3. The vessel 1 is provided with an integral filling tube 2 which is capable of passing through a sphincter valve 4 set in the glove box 3. Material can thus be transferred from the interior of the glove box 3 to the vessel 1 via the filling tube 2. The filling tube 2 is of composite construction and comprises an inner tube of aluminum alloy of proof stress 17 tons f/sq in intimately incorporated in a thicker outer tube of aluminum alloy of proof stress 5 tons f/sq in, the ratio of thickness of the tubes being 1:10. On completion of the transfer of material to the vessel 1 the filling tube 2 is constricted, cropped and cold welded by tools 5 powered by hydraulic rams 6, to provide at both cropped ends of the filling tube 2 a seal as shown in the enlarged fragmentary view of FIG. 2. The vessel 1 can then be removed and replaced by another vessel for receiving material, conveniently by hydraulic means, the filling tube of the replacing vessel being used to displace the remains of the original filling tube 2 from the valve 4 into the glove box 3.

FIG. 3 of the drawings shows a modified form of the invention with an aluminum alloy vessel 11 similar to the vessel 1 for receiving material from an area of total containment 13. The vessel 11 is provided with an integral filling tube 12 which is capable of passing through a sphincter valve 14 set in the wall of the containment 13 so that material can be transferred from the interior of the containment 13 to the vessel 11 via the filling tube 12. The filling tube 12 consists of a tubular part 15 of aluminum alloy (as described in relation to FIG. 1) joined to a sleeve 16 of polyvinylchloride which forms a seal with the sphincter valve 14 and is shaped internally to provide a convenient entry to the upper end of the tubular part 15 which is welded or screwed at its lower end to the vessel 11. At the lower end of the sleeve 16 is a conical depression 17 which can receive the tapered upper end 18 of another sleeve as hereinafter described. Tools 5 and hydraulic rams 6 are provided as in FIG. 1. Means (not shown in FIG. 3) are also provided for metering material into the sleeve 16 which can accept a funnel at its upper end.

The operation of the embodiment of FIG. 3 is the same as that of FIG. 1. On completion of transfer of material to the vessel 11 the tubular part 15 of the filling tube 12 is constricted, cropped and cold welded by the tools 5 and a seal obtained as shown in FIG. 2. The vessel 11 is then removed and replaced by another vessel for receiving material, the sleeve 16 of the replacing vessel displacing the sleeve 16 of the previous filled vessel through the sphincter valve 14 into the containment 13 without breaking the seal between the containment and the ambient atmosphere. A deformable rubber ring 19 may be provided about the sphincter valve 14 to prevent inadvertent removal of a sealed off sleeve 16 into the ambient atmosphere.

In the tubular part 15 the inner aluminum alloy may be replaced by stainless steel. The vessel 11 may also be of stainless steel.

We claim:

1. A vessel for receiving material from an area of total containment, provided with an integral filling tube capable of passing through a sphincter valve and of being constricted to the point of severance to obtain simultaneous sealing at both ends of the disjunction provided upon severance, at least part of said sealing tube being of a composite construction comprising a thin inner tube member of low ductility material intimately incorporated in a thicker outer tube member of high ductility material, the physical characteristics of said materials being such that the material of the inner tube member will be constricted and then fractured prior to the final sealing of the composite sealing tube by the material of the outer tube member, at least one of said tube members being constructed of an aluminum alloy.

2. A vessel as claimed in claim 1 wherein said inner tube member is constructed of stainless steel and the outer tube member is constructed of an aluminium alloy.

3. A vessel as claimed in claim 1 wherein said inner tube member is constructed of a first aluminium alloy and the outer tube member is constructed of a further aluminium alloy.

* * * * *